United States Patent [19]

Wainwright

[11] Patent Number: 4,900,995
[45] Date of Patent: Feb. 13, 1990

[54] VEHICLE WINDOW WIPERS WITH ALTERNATING SYMMETRICAL OVERLAP

[75] Inventor: Richard E. Wainwright, Kettering, Ohio

[73] Assignee: General Motors Corporation, Detroit, Mich.

[21] Appl. No.: 371,154

[22] Filed: Jun. 26, 1989

[51] Int. Cl.⁴ .............................................. B60S 1/08
[52] U.S. Cl. ..................................... 318/443; 318/54; 318/102; 318/DIG. 2
[58] Field of Search ....................... 318/35, 41, 49, 53, 318/54, 65, 85, 101, 102, 443, 444, DIG. 2

[56] References Cited

U.S. PATENT DOCUMENTS

| | | |
|---|---|---|
| 3,049,742 | 8/1962 | Kato et al. . |
| 3,721,878 | 3/1973 | Gumbert ............................. 318/443 |
| 4,405,887 | 9/1983 | Tamura et al. ...................... 318/443 |
| 4,431,954 | 2/1984 | Carpenter et al. . |
| 4,492,904 | 1/1985 | Graham ............................... 318/444 |
| 4,585,980 | 4/1986 | Gille et al. ....................... 318/443 X |
| 4,665,488 | 5/1987 | Graham et al. . |
| 4,670,695 | 6/1987 | Licata et al. ........................ 318/443 |
| 4,723,101 | 2/1988 | Bauer et al. . |

Primary Examiner—Bentsu Ro
Attorney, Agent, or Firm—Robert M. Sigler

[57] ABSTRACT

A pair of wiper blades on a vehicle window are oscillated in opposing movement from an overlapping inner wipe arrangement, with upper and lower overlapped blades, outward to separated outer wipe positions and inward to the overlapping inner wipe arrangement with the positions of the blades reversed. Since the upper blade on the way out becomes the lower blade on the way back, it does not need to pause in its outer wipe position and it thus does not need to be subjected to a large acceleration in maintaining fast wipe cycles on large vehicle windshields. This reduces stress on the arm and blade and blade end whip.

7 Claims, 5 Drawing Sheets

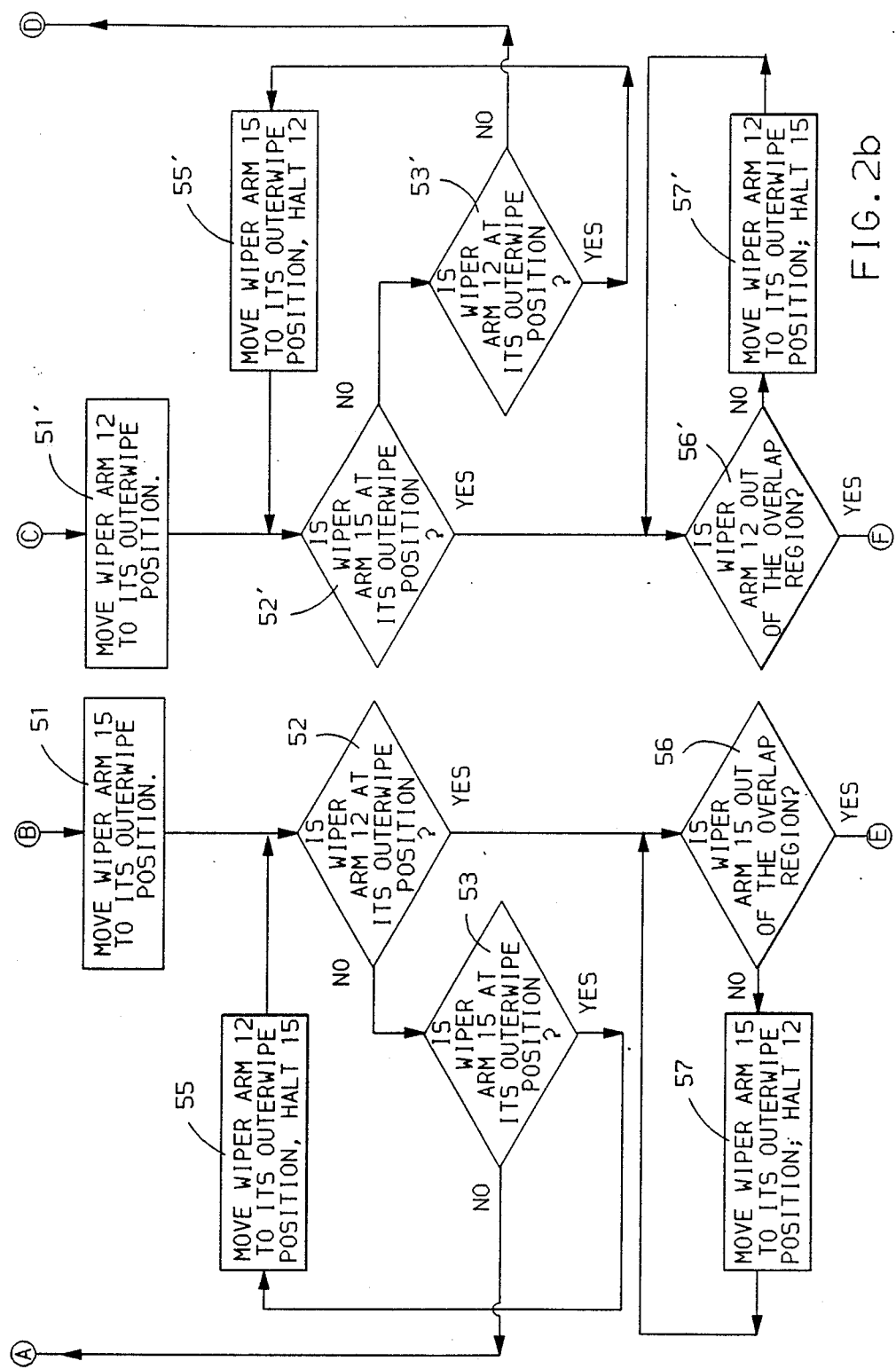

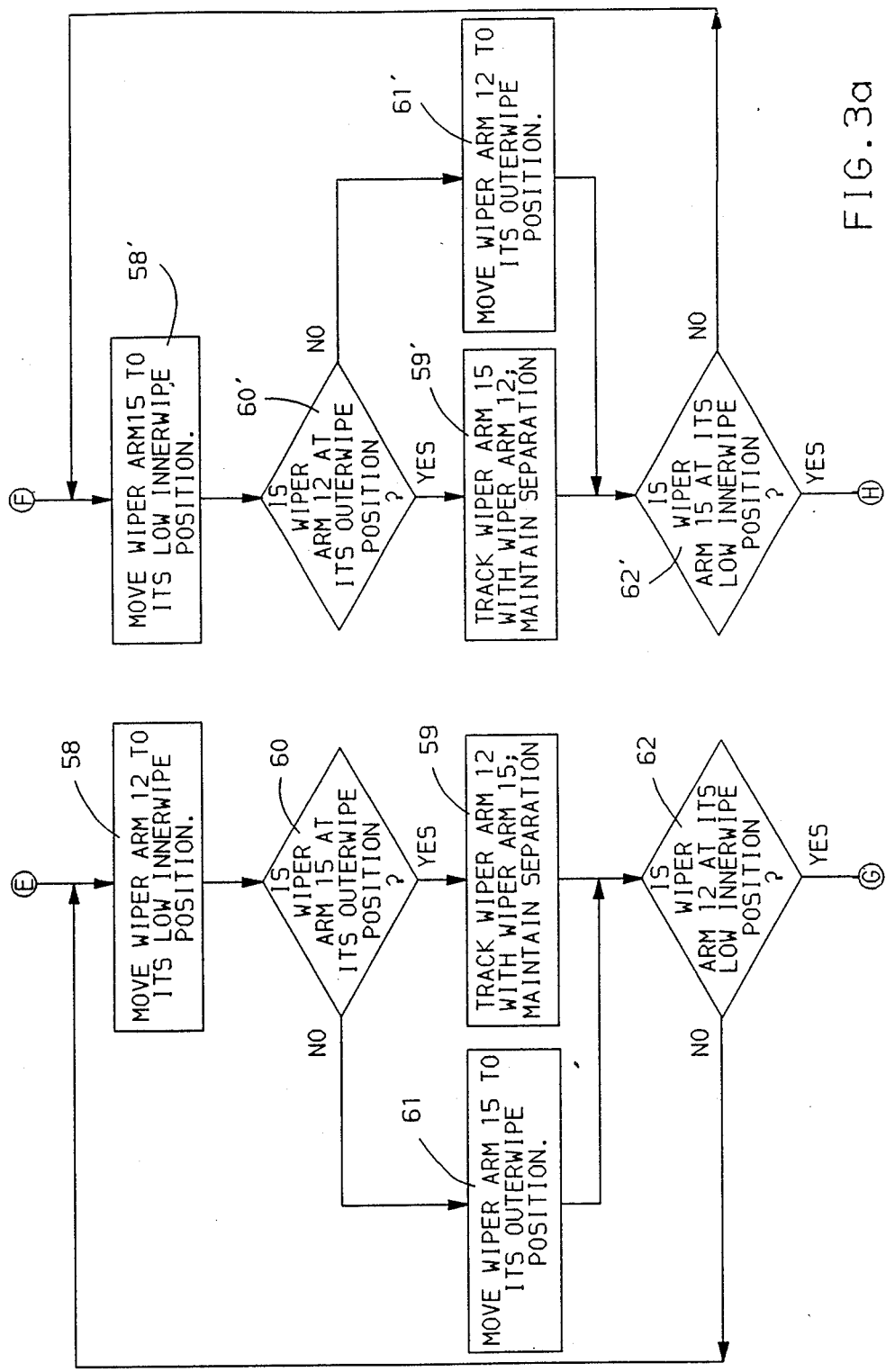

VEHICLE WINDOW WIPERS WITH ALTERNATING SYMMETRICAL OVERLAP

BACKGROUND OF THE INVENTION

Improved aerodynamics for motor vehicles are leading to future windshield designs with more pronounced rake angles, which produce a larger window surface. A window wiper system for such windshields must therefore include longer, more massive wiper arms and blades to wipe the required percentage of the larger surface. In a symmetrical overlap wipe pattern, in which the blades are oscillated in opposing movement between separated outer wipe positions and an overlapping inner wipe arrangement, longer arms and blades produce a larger overlap or collision avoidance region and, consequently, a need for increased blade separation.

Present symmetrical overlap wiper systems use a single motor with an unbalanced linkage to move the wiper blades through a repeating pattern, with one of the blades always overlapping the other in an overlapping inner wipe arrangement. The overlapping blade leads the other from the overlapping inner wipe arrangement through the overlap region toward its outer wipe position and follows the other back through the overlap region into the overlapping inner wipe arrangement. It must therefore pause at its outer wipe position to allow the other blade time to reach its outer wipe position and return so the other blade can precede it back into the overlap region. When the paused blade is restarted, it must be rapidly accelerated to make up for the time lost in the pause in order to achieve high wipe rates such as 75 wipes per minute; and this rapid acceleration of a large mass puts extra stress on the linkage components and may lead to an undesired whipping action of the blade end.

SUMMARY OF THE INVENTION

In this invention, a pair of wiper blades is operated on a vehicle window in a symmetrical overlap pattern with a reduction in the required acceleration necessary to achieve a specified high wipe rate. This is accomplished by alternating the overlapping wiper blade with each return of the wiper blades to the overlapping inner wipe condition, to create an alternating symmetrical overlap (ASOL) pattern. Thus, the first blade out no longer has to wait while the other blade reaches its outer wipe position but starts back without pause, providing, as will normally be the case, that the other blade has cleared the overlap region. With no requirement for a long pause in the outer wipe position, the blade does not need as great an acceleration in its return. The alternating symmetrical overlap system of this invention thus significantly reduces stress on arms, blades and linkages and reduces blade end whip at high wipe cycle rates. Further detail and advantages of this invention will be apparent from the accompanying drawings and following description of a preferred embodiment.

SUMMARY OF THE DRAWINGS

FIGS. 2a, 2b, 3a and 3b are flow charts describing the method of the invention by the apparatus of FIG. 1.

DESCRIPTION OF THE PREFERRED EMBODIMENT

Figure 1:
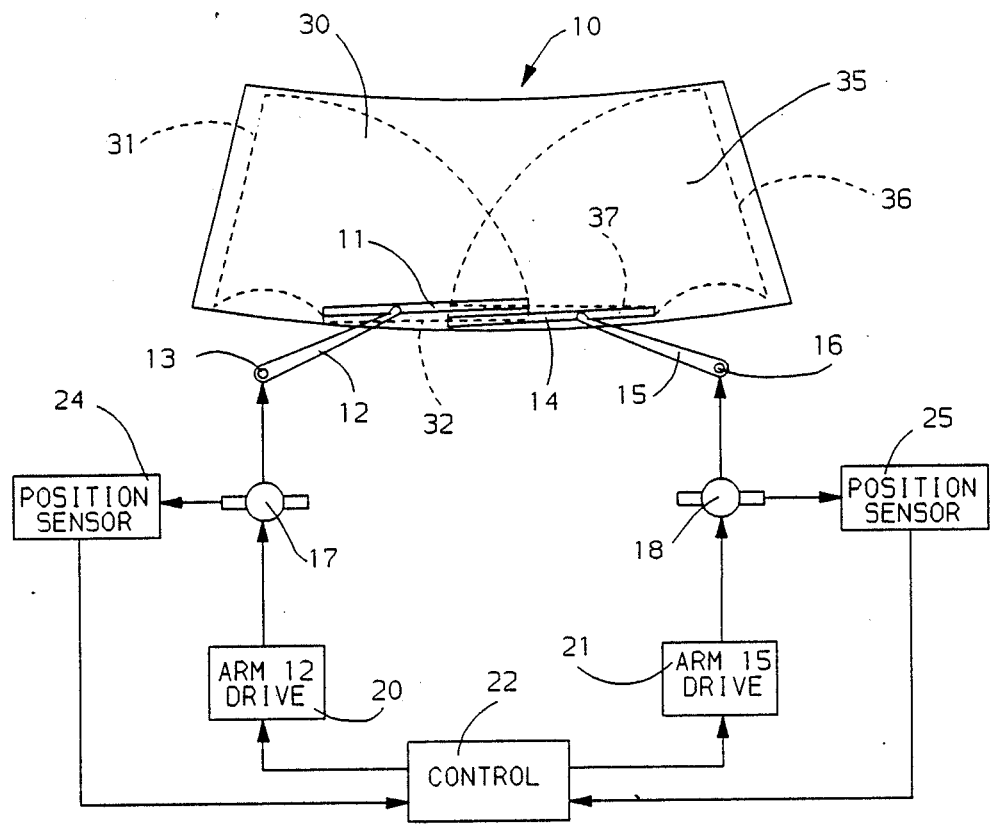
FIG. 1 is a schematic diagram of a wiper system embodying the invention.

Referring to FIG. 1, a motor vehicle window such as windshield 10 includes a wiper blade 11 carried by an arm 12 pivoted on a shaft 13 below windshield 10 and a wiper blade 14 carried by an arm 15 pivoted on a shaft 16 below windshield 10. For purposes of this application, it makes no difference which of blades 11 and 14 is on the driver side and which is on the passenger side of the vehicle. Shaft 13 is turned by an electric motor 17; and shaft 16 is turned by a separate electric motor 18. Motors 17 and 18 may be permanent magnet DC motors, shown with two brushes although three brush motors could be used, and may drive shafts 13 and 16 through reduction gearing. The separate motors 17 and 18 provide independent control of the wiper blades 11 and 14 for the practice of this invention.

Motors 17 and 18 are powered by motor drive units 20 and 21, respectively, which are controlled by a control unit 22. Position sensors 24 and 25 are associated with wiper blades 11 and 14, respectively, to indicate the position of each and feed this information back to control 22. The position sensors may be constructed to sense the rotational positions of the armatures of motors 17 and 18, of shafts 13 and 16, or of any associated component having a position which is a single valued function of blade position. The position sensors may be, for example, potentiometer voltage dividers connected across a regulated voltage so as to generate analog voltage signals indicative of blade position. If the regulated voltage is subject to variation, it may also be provided to control 22 and used as a ratiometric reference for the blade position signals.

Control 22 may be based on a digital computer, such as the Motorola MC6805R2 (R) one chip microcomputer. This device includes on-chip CPU, RAM, ROM, clock, timer, A/D conversion, digital input and output lines, and analog input lines. Hardware connections for this computer are well known and described in the Motorola Microprocessors Data Manual, available from Motorola, Inc., Austin, Tex. 78721. The computer is to be provided with a stored program in ROM to perform the invention as described below; and outputs are provided to motor drive units as described in U.S. Pat. No. 4,665,488, issued May 12, 1987 to Graham et al. Briefly, control 22 provides two digital outputs to each of motor drive units 20 and 21; and the drive units respond to the four possible digital combinations of the two outputs to enable four possible modes for each of motors 17 and 18: (1) motor drive in one direction, (2) motor drive in the opposite direction, (3) motor dynamically braked, and (4) motor deactivated and not braked (coasting). Motor speed selection may be obtained, if desired, through digital switching in duty cycle fashion to vary the average motor armature voltage. In addition to inputs from wiper position sensors 24 and 25 and the regulated supply voltage, the computer of control 22 may also receive an input from any control switches for selecting modes of wiper operation.

Wiper blades 11 and 14 are oscillated across windshield 10 through wipe areas 30 and 35, respectively. Wipe area 30 of wiper blade 11 is bounded by an outer wipe position indicated by dashed line 31 adjacent the side of the windshield and a low inner wipe position indicated by dashed line 32 adjacent the bottom of windshield 10 and further includes a high inner wipe position in which wiper blade 11 is shown in FIG. 1 and which is located just above low inner wipe position 32. In operation, blade 11 will be oscillated back and forth between its outer wipe position and, alternately, its high and low inner wipe positions. Similarly, wiper blade 14 defines a wipe area 35 bounded by an outer wipe position indicated by dashed line 36 and a low inner wipe position in which wiper blade 14 is shown in FIG. 1. A high inner wipe position for blade 14 is indicated by dashed line 37 located just above the low inner wipe position as indicated by the position of blade 14. In operation, blade 14 will be oscillated back and forth between its outer wipe position and, alternately, its high and low inner wipe positions, so that it also alternates high and low inner wipe positions with respect to blade 11.

An overlapping inner wipe arrangement thus comprises two possible inner wipe conditions: (1) blade 11 in its high inner wipe position with blade 14 in its low inner wipe position, as shown in FIG. 1; and (2) blade 11 in its low inner wipe position with blade 14 in its high inner wipe position, which is the reverse of that shown in FIG. 1. On any given ASOL wipe cycle, starting from one of the inner wipe conditions, both blades are driven upward toward their outer wipe positions, with the lower blade (starting from its low inner wipe position) maintained at least a predetermined separation distance behind the upper blade (starting from its high inner wipe position) through the overlap region. When the upper blade reaches its outer wipe position and the lower blade has cleared the overlap region, the upper blade is driven back toward its low inner wipe position and becomes the lower blade. The lower blade will normally clear the overlap region in outward movement before the upper blade reaches its outer wipe position; and the upper blade may then normally reverse immediately with no pause to begin its return. The former lower blade, when it reaches its outer wipe position, becomes the upper blade and is driven back down to its high inner wipe position while being maintained at least a predetermined separation distance behind the now lower blade, at least through the overlap region. The cycle repeats until it is stopped by the operator, with the blades alternating high and low inner wipe positions.

Figure 2A:
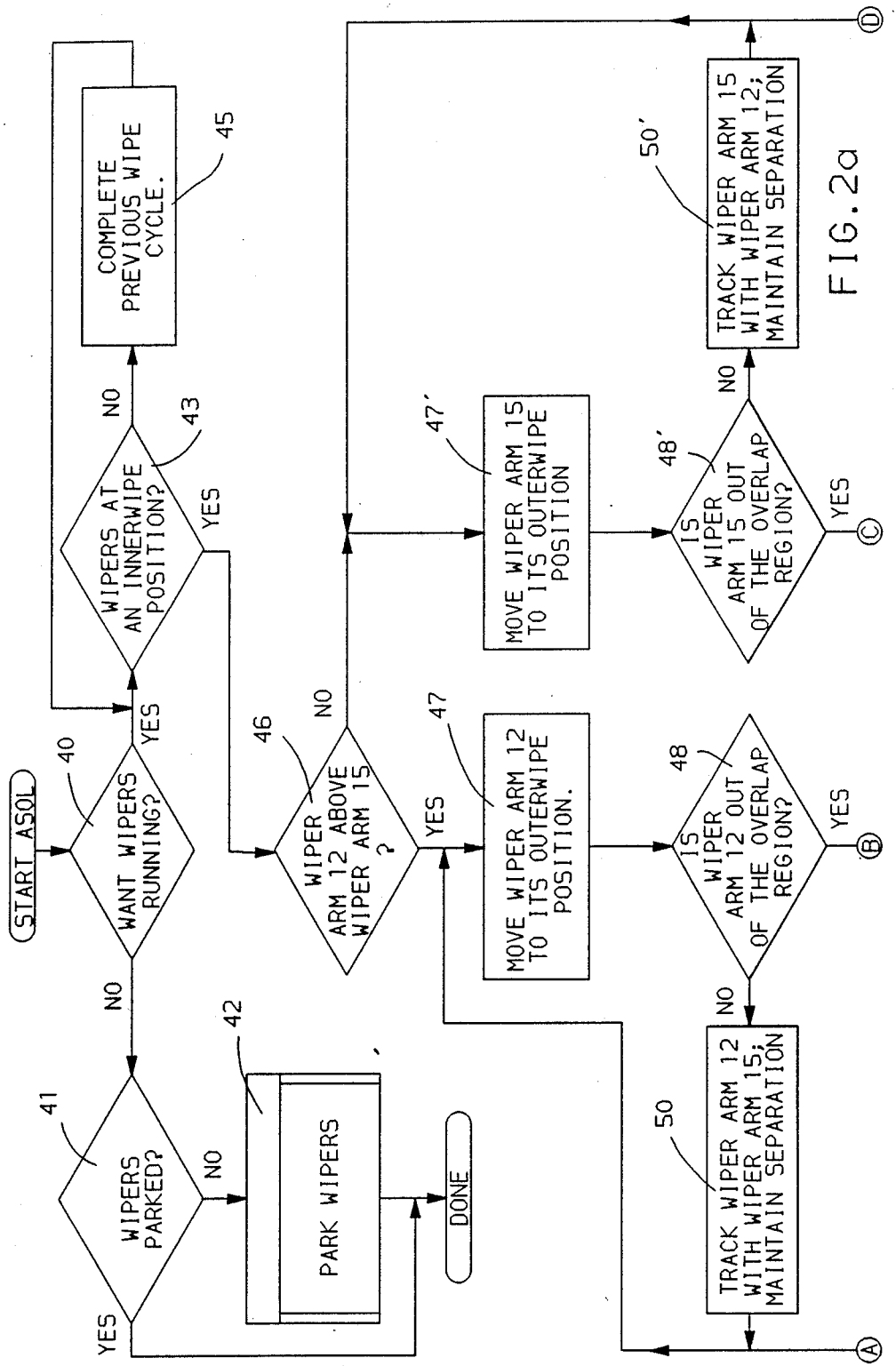

The operation is described in more detail with reference to FIGS. 2a, 2b, 3a and 3b, which describe the programming of control 22 in flow chart form. Throughout this description, the term wiper arm 12 refers also to wiper blade 11 and the term wiper arm 15 refers also to wiper blade 14, since the arms and blades move together. The term "arm" is used rather than the term "blade" simply because it fits into the flow chart easier. Referring to FIG. 2a, the ASOL routine starts by asking, at decision point 40, if the wipers should be running. If not, as would be the case if a main vapor control switch were in its OFF condition, the routine asks, at decision point 41, if the wipers are to be parked. If they are, the routine is exited. If not, a wiper park subroutine 42 is performed before exit. If, at decision block 40, the wipers are to be running, as indicated by a main wiper control switch, the routine asks at decision point 43 if both wiper blades are at inner wipe positions. If not, the previous cycle will be completed at step 45 to bring wiper blades 11 and 14 back to high and low inner wipe positions. Such an occurrence is possible, for example, when the vehicle ignition was switched off at the end of a previous period of engine use with the wiper switch left in an operational condition and the wiper blades in the middle of a wipe cycle so that the blades are left on the glass within the wipe areas. Step 45 can be effective to simply determine which blade is lower and initiate return of that blade to its low inner wipe position and the return of the higher blade to its high inner wipe position, while maintaining a minimum blade separation through the overlap region. From step 45, the routine returns to decision point 43 so as to continue the operation until both wipers are at their targeted inner wipe positions. The wiper parking subroutine may operate in a similar manner.

From decision point 43, if both wipers are at inner wipe positions, the routine asks, at decision point 46, which wiper arm (or blade) is higher. If it is wiper arm 12, the routine acts, at step 47, to move wiper arm 12 toward its outer wipe position. At decision point 48, the routine then asks if wiper arm 12 is out of the overlap region. If it is not, the routine, at step 50, continues to move wiper arm 12 to its outer wipe position but starts wiper arm 15 toward its outer wipe position while tracking its progress with that of wiper arm 12 to maintain a predetermined minimum separation. The routine loops from step 50 back to step 47. From decision point 48, once wiper arm 12 is out of the overlap region, the routine proceeds to step 51, in FIG. 2b, in which it causes wiper arm 15 to move freely toward its outer wipe position. Since both wiper blades are out of the overlap region, there is no possibility of collision.

From step 51, the routine asks, at decision point 52, if wiper arm 12 has reached its outer wipe position. If not, the routine asks, at decision point 53, if wiper arm 15 has reached its outer wipe position. If so, it is halted in step 55 and wiper arm 12 is continued to its outer wipe position before the routine returns to decision point 52. This loop will not normally be used, since wiper arm 12 has a head start out of the overlap region; but, if blade 11 is slowed, it will prevent the blades from getting out of synchronization. This loop will also probably not be necessary if separation is maintained entirely through the wipe cycle.

Once wiper arm 12 has reached its outer wipe position, as determined at decision point 52, the routine asks, at decision point 56, if wiper arm 15 has cleared the overlap region. If not, wiper arm 12 is halted at its outer wipe position in step 57; and wiper arm 15 continues to move toward its outer wipe position, with the routine looping back to decision point 56. In normal operation, however, neither of steps 55 and 57 will be reached; and wiper arm 12 will be reversed without pause.

When, at decision point 56, wiper arm 15 is determined to be out of the overlap region, the routine proceeds to step 58, in FIG. 3a, in which it causes wiper arm 12 to be reversed and to move toward its low inner wipe position. The routine then asks, at decision point 60, if wiper arm 15 has reached its outer wipe position. If not, the routine continues to move wiper arm 15 to its outer wipe position in step 61 and asks, at decision point 62, if wiper arm 12 has reached its low inner wipe position. If it has not, the routine returns to step 58. From decision point 60, if wiper arm 15 is at its outer wipe position, the routine reverses the direction of wiper arm 15 in step 59 and causes it to be driven back toward its high inner wipe position while maintaining a predetermined minimum separation behind wiper arm 12, at least through the overlap region.

Figure 3B:
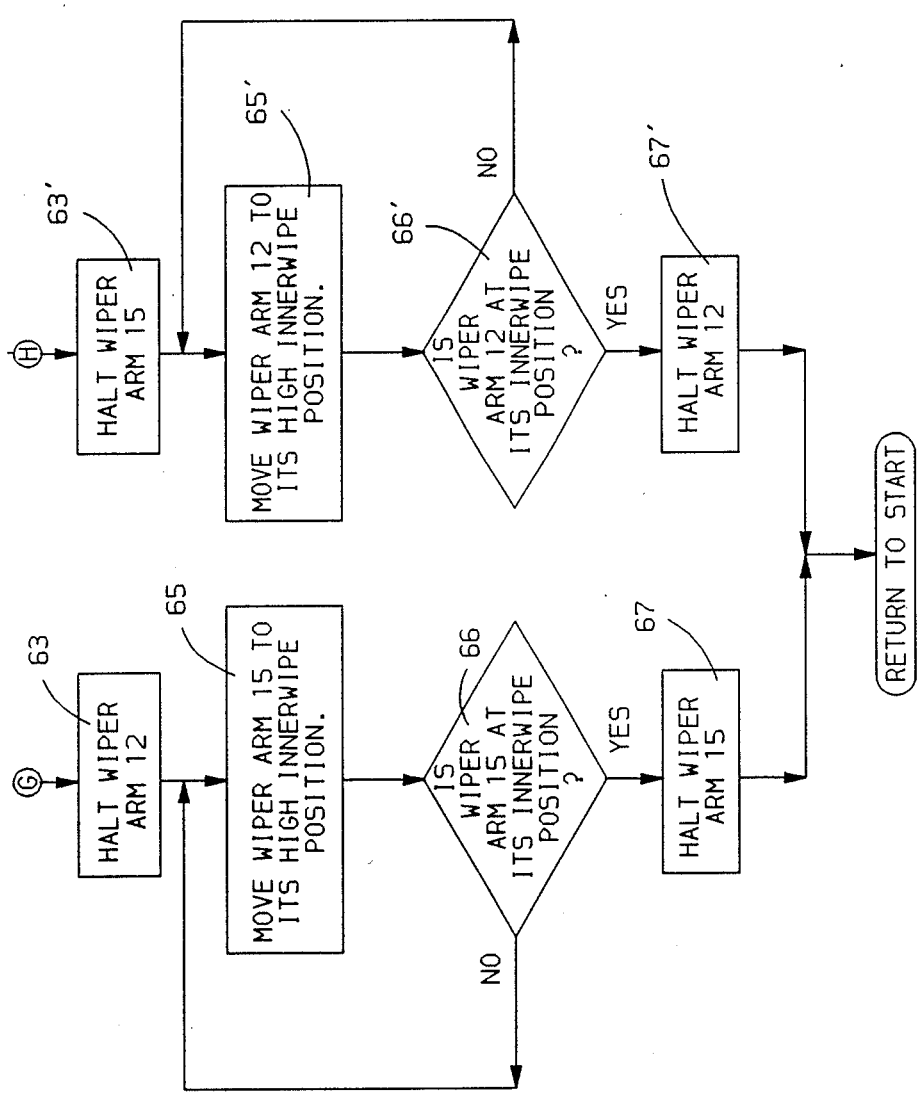

When, at decision point 62, wiper arm 12 is found to have reached its low inner wipe position, the routine halts wiper arm 12 in step 63 of FIG. 3b and continues moving wiper arm 15 back to its high inner wipe position in step 65. At decision point 66, the routine asks if wiper arm 15 has reached its high inner wipe position. If not, the routine loops back to step 65; if so, the routine halts wiper arm 15 in step 67 and returns to the start of the routine.

From decision point 46, if the routine had determined that wiper arm 15 was above wiper arm 12, a similar flow chart would have been traveled, but with references to wiper arm 12 and 15 reversed. Thus, in FIGS. 2a, 2b, 3a and 3b, this "mirror image" flow chart includes elements with primed numerals similar to the matching elements already described. There is no need to describe these primed numeral elements in detail, since they are similar in function to the unprimed elements of similar number, but with reversal of arms 12 and 15. In the general operation of the system, however, the primed and unprimed elements of the flow chart will alternate on each wipe cycle, as the alternate wiper arm and blade is brought back to its high inner wipe position to lead off the next cycle.

This embodiment of the method will be seen to have error recovery built in, in case the lower wiper blades are stopped, while moving out, clear of the overlap region but short of the outer wipe position. For example, assume the routine is looping around elements 58, 60, 61 and 62 in FIG. 3a, with wiper arm 12 moving smoothly back to its low inner wipe position and with wiper arm 15 clear of the overlap region but unable to overcome an obstacle on its way out to its outer wipe position. When wiper arm 12 finally reaches its low inner wipe position and is halted at step 63, wiper arm 15 will be reversed from wherever it is stopped to return to its high inner wipe position so the next wipe cycle can begin with the wipers reversed in inner wipe positions according to the invention.

For those steps in the flow charts in which it is indicated that one of the arms is tracked with the other to maintain a predetermined minimum separation, the action involves comparing the position sensor readings of the two arms or blades. If the comparison shows the following blade position encroaching on that minimum separation, the motor for the following blade may be turned off or its duty cycle decreased. In addition, or alternatively, the duty cycle of the leading blade could be increased. In either case, the separation should increase. The reverse is true if the separation as so measured becomes greater than some higher predetermined separation.

The embodiments of the invention in which an exclusive property or privilege is claimed are defined as follows:

1. A method of operating a pair of wiper blades on a vehicle window comprising the steps:
    oscillating the wiper blades in repeating cycles of opposing movement through overlapping wipe areas on the window between separated outer wipe positions and an overlapping inner wipe arrangement in which one of the wiper blades overlaps the other of the wiper blades, with the one of the wiper blades preceding the other of the wiper blades in movement away from the overlapping inner wipe arrangement; and,
    in each successive cycle, moving the one of the wiper blades which precedes the other of the wiper blades in movement away from the overlapping inner wipe arrangement so as to also precede the other of the wiper blades in movement back into the overlapping inner wipe arrangement so that the wiper blades alternate overlapping each other in the overlapping inner wipe arrangement on successive cycles.

2. The method of claim 1 in which the overlapping wipe areas define an overlap region in which the wiper blades could collide and in which the wiper blades are maintained a predetermined distance apart at least through the overlap region.

3. The method of claim 1 in which each of the wipe areas and wiper blades defines a high inner wipe position and a low inner wipe position and the overlapping inner wipe arrangement comprises one of the wiper blades in its high inner wipe position and the other of the wiper blades in its low inner wipe position, the method comprising alternating the wiper blades in the high inner wipe position on each successive cycle.

4. A method of operating first and second wiper blades on a vehicle window through wipe areas between separated outer wipe positions and overlapping low inner wipe positions, the wipe areas further defining overlapping high inner wipe positions and an overlap region in which the wiper blades could collide, the method comprising the steps:
    with the first wiper blade starting from its high inner wipe position and the second wiper blade starting from its low inner wipe position, driving the first and second wiper blades toward their outer wipe positions while maintaining the second wiper blade at least a predetermined distance behind the first wiper blade through the overlap region;
    driving the first wiper blade from its outer wipe position back to its low inner wipe position after the second wiper blade has cleared the overlap region;
    driving the second wiper blade from its outer wipe position back to its high inner wipe position while maintaining the second wiper blade at least a predetermined distance behind the first wiper blade through the overlap region;
    with the first wiper blade starting from its low inner wipe position and the second wiper blade starting from its high inner wipe position, driving the first and second wiper blades toward their outer wipe positions while maintaining the first wiper blade at least a predetermined distance behind the second wiper blade through the overlap region;
    driving the second wiper blade from its outer wipe position back to its low inner wipe position after the first wiper blade has cleared the overlap region; and
    driving the first wiper blade from its outer wipe position back to its high inner wipe position while maintaining the first wiper blade at least a predetermined distance behind the second wiper blade through the overlap region, whereby the first and second wiper blades are alternately overlapped one above the other in the inner wipe positions.

5. A window cleaning apparatus for a vehicle window comprising a pair of wiper blades carried by arms with a separate motor drive apparatus for each arm adapted to move the associated wiper blade through a wipe area on the window between an outer wipe position and a selected one of a high inner wipe position and a low inner wipe position, each motor drive apparatus including a wiper position sensor, the window cleaning apparatus further comprising a motor drive control adapted to oscillate the wiper blades in repeating cycles of opposing movement through the wipe areas, the motor drive control being responsive to the wiper position sensors to move one of the wiper blades to its low inner wipe position and the other of the wiper blades to its high inner wipe position to begin each cycle, with the wiper blades alternated in their respective high and low inner wipe positions on successive cycles.

6. The window cleaning apparatus of claim 5 in which the wipe areas define an overlap region in which the wiper blades could collide, the motor drive apparatus being further responsive to the wiper position sensors to maintain a predetermined separation between the wiper blades at least through the overlap region.

7. The window cleaning apparatus of claim 6 in which the motor drive apparatus is responsive to the wiper position sensors in each successive cycle to sense the arrival at its outer wipe position of the one of one of the wiper blades which began the cycle in its high inner wipe position and, if the other of the wiper blades has cleared the overlap region, to immediately reverse the one of the wiper blades and move it without pause back toward its low inner wipe position.

* * * * *